United States Patent [19]
Wyatt

[11] Patent Number: 4,463,977
[45] Date of Patent: Aug. 7, 1984

[54] CARRIER FOR LARGE PLANAR ARTICLES

[76] Inventor: James R. Wyatt, 5207 N. 33rd St., Phoenix, Ariz. 85018

[21] Appl. No.: 466,047

[22] Filed: Feb. 14, 1983

[51] Int. Cl.³ .............................................. B65G 7/12
[52] U.S. Cl. .................................................... 294/26
[58] Field of Search ................... 294/26, 15, 16, 19 R, 294/2, 26.5, 27 R, 32, 34, 17, 92; 16/110 R, 114 R, 114 B, 124

[56] References Cited
U.S. PATENT DOCUMENTS

| 2,428,941 | 10/1947 | Packard | 294/26 |
| 2,623,772 | 12/1952 | Johnson | 294/26 |
| 4,098,442 | 7/1978 | Moore | 294/26 |

Primary Examiner—James B. Marbert
Attorney, Agent, or Firm—Cates & Roediger

[57] ABSTRACT

A hand-grippable carrier for individual use in carrying large planar articles which contains a central grip and two curved support members depending therefrom. A combined spacer and grip is provided proximate to the main grip for initially positioning the carrier for transport.

2 Claims, 3 Drawing Figures

CARRIER FOR LARGE PLANAR ARTICLES

BACKGROUND OF THE INVENTION

This invention relates to apparatus for manually transporting large planar articles and, in particular, for permitting the transport of large area sheets of wallboard, plasterboard, plywood, pressed wood and the like by a single individual.

Today, the building industry is characterized by escalating wage scales for the workers. Thus, increasing interest is shown in devices and work techniques which can reduce the number of man-hours required to perform given tasks at the construction site. At the vast majority of construction jobs, large quantities of planar or sheet materials are off-loaded from the delivering vehicle and deposited on the ground in bulk for later individual transport and usage. From the storage place individual sheets of material are withdrawn and transported, normally by two men, to the location where the sheet is to be installed. Since sheet material is at least four feet by eight feet and in some cases four feet by twelve feet the use of two individuals is preferred to avoid injury to the worker or damage to the material. While the use of mobile carriers traversing the ground would permit a single individual to move the sheet material about the construction site, the nature of most construction sites does not lend itself to the use of rollers, dollies, skids and similar devices. The ground surface is typically unfinished, soft and strewn with debris. Furthermore, ramps and other interconnecting means are either not designed and installed at this time in the construction process or are located in areas remote from the place of installation.

Accordingly, the present invention is directed to the provision of a device which enables a single individual to transport a large planar article to a desired location without assistance. In addition, the device readily permits the individual to place the carrier in position beneath the article and then to raise it to the transport position. Further, the device is a lightweight and durable integral unit of simplified design. This enhances the cost-benefit relationship governing its usage.

SUMMARY OF THE INVENTION

The present invention is directed to a carrier for large planar articles which enables an individual to transport the article to the desired work station with a reduced risk of damage to either the article, the surrounding environment or the worker transporting it. The carrier includes a hand-grippable cross member with a centrally located absorbent grip thereon that is held substantially parallel to the ground during transport.

Each end of the cross member is connected to a depending arm which extends downwardly therefrom when the carrier is in transport position. At the end of each depending arm, an edge-receiving portion is provided. The edge-receiving portion extends outwardly from the plane which substantially contains the cross member and depending arms and receives the bottom edge of the article being transported. In practice, the edge-receiving portions are curved outwardly and upwardly to provide both vertical and lateral support for the article being transported.

A spacing means that is itself hand-grippable is affixed to the carrier and extends outwardly from the plane containing the arms and the cross member towards the edge-receiving portions. This spacing means extends between the hand held cross member and the vertically positioned article during transport to both aid in maintaining the article substantially vertical and to protect the individual's hand during transport.

The placement of the article on the carrier occurs when the carrier is placed on the ground with the edge-receiving portions and the spacing means extending upwardly. The individual positions the article so that its bottom edge extends across the depending arms while placing one hand on the top edge of the article. In this carrier position, the hand-grippable spacing means extends upwardly from the ground and can be readily grasped by the individual. The individual takes hold of the spacing means with his free hand and pulls upwardly thereby causing the carrier to rotate on the underside of the edge-receiving portions and slide beneath the lower edge of the article. When the carrier is pulled to the vertical position, the lower edge of the article rests on the bottom part of the edge-receiving portions and maintains the carrier in the upright transport position so that the individual can remove his hand from the spacing means and grasp the cross member.

The lifting force is applied to the cross member while the other hand remains placed on the upper edge of the article. By exerting a modest force with this hand in a direction towards his body, the individual urges the article against the spacing means to maintain its vertical position during transport. The spacing means is generally U-shaped and located between the article and the hand-grippable cross member to prevent the article from contacting the hand used to provide the lifting force.

Further features and advantages of the invention will become more readily apparent from the following detailed description of a specific embodiment thereof when taken in conjunction with the accompanying drawings.

DESCRIPTION OF THE PREFERRED EMBODIMENT

Figure 1:
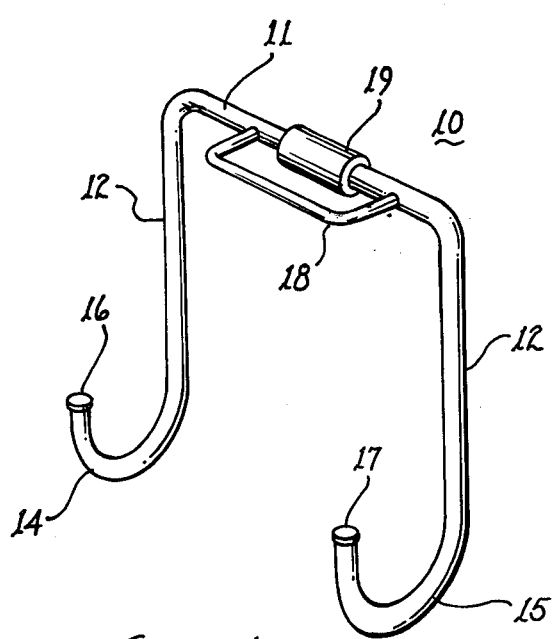
FIG. 1 is a view in perspective of one embodiment of the invention.
Figure 2:
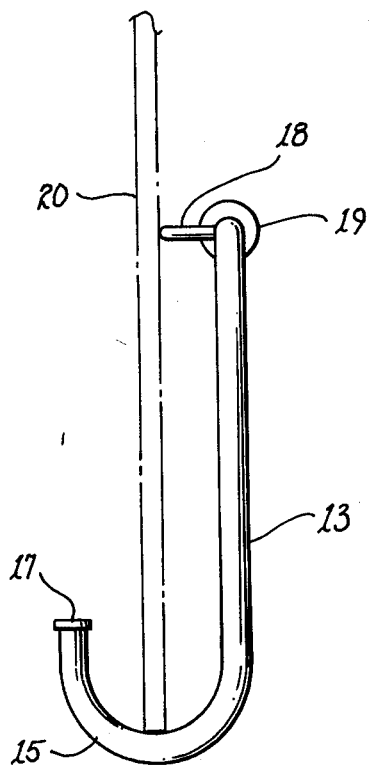
FIG. 2 is a side view of the embodiment of FIG. 1.

Referring now to FIG. 1, the carrier 10 is shown as including a cross member 11 having first and second depending arms 12, 13 connected to the ends thereof. As shown in FIG. 2, the cross member and depending arms are oriented so as to reside within the same plane for reasons that will later be discussed.

Each depending arm 12, 13 has a corresponding edge-receiving portion 14, 15 connected thereto. The edge-receiving portions extend outwardly from the plane containing the cross member and the depending arms and are adapted to receive the lower edge of the article during transport. Since in this embodiment shown the carrier is fabricated from lightweight tubular aluminum stock, and caps 16, 17 are provided to close the open ends of receiving portions 14 and 15.

A hand-grippable spacer means 18 is shown affixed to cross member 11 and extends outwardly in the direction of the edge-receiving portions. The space means is generally U-shaped with the ends thereof affixed to the cross member near its opposing ends. The central portion of the cross member is provided with a hand grip 19 for the comfort of the user. The grip is located in the central region of the cross member 11 for proper balance during the transportation of an article.

In operation, the carrier is placed on the ground or basal surface with the cross member 11 and depending arms 12, 13 adjacent the ground. As a result, the grippable spacer 18 extends upwardly as do the edge-receiving portions 14, 15. The article to be transported is guided so that the central part of its bottom edge rests across the junctures of the depending arms and the corresponding edge portion. This is readily accomplished by a single person who slides the sheet of plasterboard or plywood off the edge of the pallet or stack and tilts it upward on one edge of its long dimension. Then, one end is raised and the carrier urged thereunder.

When the carrier is in position, the individual keeps one hand on the top of the plywood sheet while the other hand grasps the spacer means 18 drawing it upward. As the carrier rotates on the outer surfaces of the edge-receiving portions 14, 15 the adjacent edge of the article being transported approaches the position shown in FIG. 2. In addition, the spacer means 18 is present to contact the surface of the article and assist in maintaining the article in a substantially vertical position. Prior to pulling the carrier all the way to the full vertical position of FIG. 2, the article can be slightly reverse tilted to permit release of the hand grip on the spacer by a slight movement of the top edge of the article. Upon release the article is then returned to the vertical position and the carrier and article are ready for transport. During the time that the user's hand is withdrawn from the spacer and prior to the time that it is placed on grip 19 the carrier remains in the position of FIG. 2 as result of the weight of the article.

Figure 3:
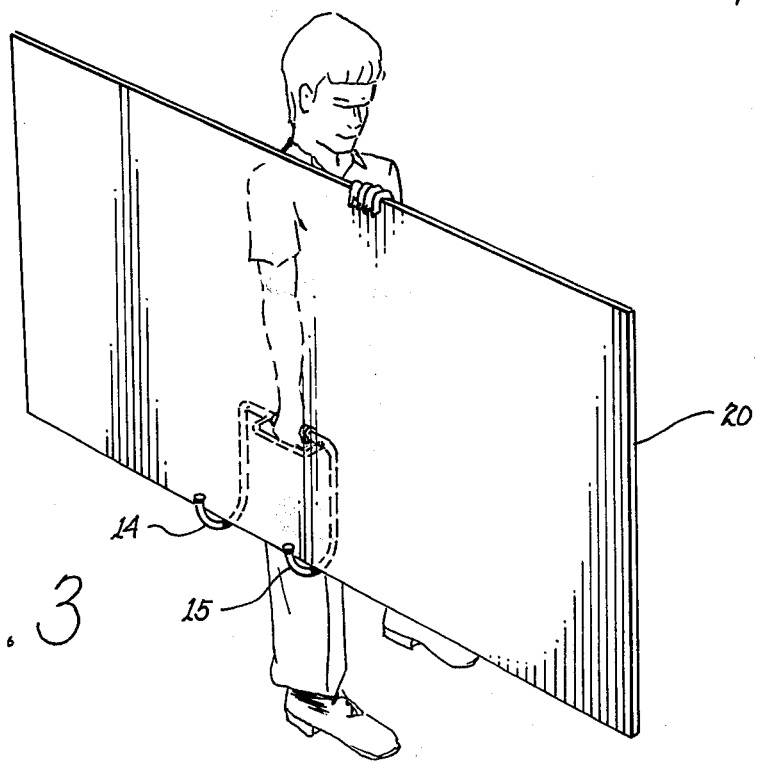
FIG. 3 is a view of the invention during use.

The transport of a large area planar article by an individual using the carrier is shown in FIG. 3. The carrier employs one hand with the user's other hand preferably located on the top edge of the article. Different shaped articles may indicate differing techniques for the relative placement of the carrier and the steadying hand. While the carrier is well-suited for the transport of other than large area construction materials for example, mattresses and springs, it is recognized that variations and modifications may be made in the foregoing described embodiment without departing from the scope of the invention as claimed.

I claim:

1. A carrier for facile placement under large planar articles and transportation of same above ground which comprises:
   (a) a hand-grippable cross member having first and second ends and a central portion therebetween;
   (b) first and second depending arms connected to said first and second ends respectively and being oriented to be substantially coplanar therewith for insertion in a first position under said article with said crossmember and arms adjacent the ground;
   (c) first and second curved edge-receiving portions connected to said first and second depending arms respectively, said curved portions extending outwardly and upwardly from the plane of said arms and crossmember for receiving the edge of the article being transported when the carrier is in a second position; and
   (d) a hand-grippable U-shaped spacing member affixed to said cross member proximate to the first and second ends thereof, the base of said spacing member extending upwardly from the central portion of the cross member when the carrier is in the first position, the application of a lifting force to said spacing member causing said carrier to rotate upon the edge-receiving portions to the second position whereby the edge of the article is moved to a position within said edge-receiving portions for transport.

2. The carrier in accordance with claim 1 wherein said hand-grippable U-shaped member comprises first and second side portions and a base member, said first and second side portions being attached to the first and second ends respectively of cross member with the length of said side portions placing the base member substantially within a vertical plane containing the base of the curved portions to thereby facilitate the transport of a planar article in a vertical position.

* * * * *